United States Patent [19]

Ishikawa et al.

[11] 4,048,424
[45] Sept. 13, 1977

[54] NOVEL HYDROCARBON RESINS AND PROCESS FOR PREPARATION THEREOF

[75] Inventors: Atsuo Ishikawa, Kamakura; Hidemi Tsubaki, Kawasaki; Hitoshi Takahata; Riso Iwata, both of Kamakura; Yonesaku Shinohara, Toyama, all of Japan

[73] Assignee: Nippon Zeon Co. Ltd., Tokyo, Japan

[21] Appl. No.: 599,952

[22] Filed: July 29, 1975

[30] Foreign Application Priority Data

Aug. 1, 1974 Japan .................................. 49-88247

[51] Int. Cl.² ..................... C08F 212/34; C08F 4/00; C08F 236/10
[52] U.S. Cl. .............................. 526/237; 260/4 AR; 260/28.5 A; 260/28.5 B; 260/897 A; 428/261; 526/290; 526/308; 526/337; 526/344; 526/916
[58] Field of Search ................. 260/80.7, 82; 526/237, 526/290, 308

[56] References Cited

U.S. PATENT DOCUMENTS

| | | | |
|---|---|---|---|
| 3,763,125 | 10/1973 | Moody et al. | 260/82 |
| 3,784,530 | 1/1974 | Osborn | 260/82 |
| 3,872,064 | 3/1975 | Pace et al. | 260/82 |
| 3,893,986 | 7/1975 | Komai et al. | 260/82 |

*Primary Examiner*—Harry Wong, Jr.
*Attorney, Agent, or Firm*—Sherman & Shalloway

[57] ABSTRACT

Hydrocarbon resins comprising (a) about 45 to 85% by weight of units derived from 1,3-pentadiene, (b) about 10 to 45% by weight of units derived from α-methylstyrene, (c) about 3 to 20% by weight of units derived from cyclopentene and (d) 0 to about 20% by weight of units derived from 1,3-butadiene and having a softening point of from about 60° C. to about 140° C., said hydrocarbon resins being prepared by polymerizing a monomeric mixture comprising (a) about 35 to 85% by weight of 1,3-pentadiene, (b) about 10 to 50% by weight of α-methylstyrene, (c) about 5 to 30% by weight of cyclopentene and (d) 0 to 15% by weight of 1,3-butadiene in a solvent comprising at least 50% by weight of an aromatic hydrocarbon in the presence of an aluminum halide as a catalyst.

11 Claims, No Drawings

NOVEL HYDROCARBON RESINS AND PROCESS FOR PREPARATION THEREOF

This invention relates to a novel hydrocarbon resin and a process for its preparation. More specifically, the invention relates to a hydrocarbon resin derived from (a) 1,3-pentadiene, (b) α-methylstyrene and (c) cyclopentene and as an optional component, (d) 1,3-butadiene, and to a process for preparing the hydrocarbon resin by polymerizing monomeric mixture comprising (a) 1,3-pentadiene, (b) α-methylstyrene and (c) cyclopentene and as an optional component, (d) 1,3-butadiene in the presence of an aluminum halide.

It has been known that cationic polymerization of 1,3-pentadiene affords polymers having various properties. These polymers are obtained as a liquid or gel, and have found their peculiar uses according to the individual properties. However, they have scarcely been found to be valuable in the field of technology where rosin, rosin derivatives, and terpene resins are used.

In recent years, various attempts have been made to improve polymers derived from 1,3-pentadiene so as to remove this defect. These attempts developed, for example, a method comprising copolymerizing 1,3-pentadiene with 2-methyl-2-butene U.S. Pat. No. 3,577,398), and a method comprising copolymerizing 1,3-pentadiene, 1,3-butadiene, 2-methyl-1-butene and 2-methyl-2-butene (U.S. Pat. No. 3,813,357). Consequently, resinous polymers derived from 1,3-pentadiene have now been drawing attention as a useful industrial material that can supersede rosin or terpene resins.

These hydrocarbon resins derived from 1,3-pentadiene do not possess entirely satisfactory properties. For example, when they are used as a tackifying agent for a butadiene/styrene copolymer rubber, they do not give entirely satisfactory results. With a view to getting over such a difficulty, a method has recently been developed which comprises copolymerizing 1,3-pentadiene, 2-methyl-2-butene, dicyclopentadiene and α-methylstyrene (see Japanese Laid-Open Pat. Application No. 80195/73). Also, French Pat. No. 2,144,317 discloses a method involving the copolymerization of a mixture of a monoolefin containing 5 carbon atoms, a diolefin and a cyclodiene with α-methylstyrene or 2-methyl-2-butene.

The Japanese Application and the French Patent state that according to the methods described therein, hydrocarbon resins having superior properties can be obtained without the formation of gel as a by-product. However, reproduction of these methods indicates that when the monomeric mixture contains a large quantity of a cyclodiene a in the first-mentioned method, gellation generally tends to occur although differing according to the polymerization conditions, and the resulting hydrocarbon resin has a relatively high melt viscosity.

We therefore attempted the polymerization of the above monomeric mixture excluding the cyclodiene, and found that a resin derived from a monomeric mixture composed mainly of 1,3-pentadiene and α-methylstyrene has a high melt viscosity, the same as a resin derived from the cyclodiene-containing monomeric mixture, and has unsatisfactory sticking power for use as a tackifier for rubber.

Accordingly, it is a primary object of this invention to provide a novel hydrocarbon resin having a low melt viscosity.

Another object of this invention is to provide a hydrocarbon resin having superior compatibility with natural or synthetic rubbers and materials for hot-melt adhesives such as paraffin, waxes, polyethylene or an ethylene/vinyl copolymer.

Still another object of this invention is to provide a hydrocarbon resin which imparts superior tackiness characteristics or adhesive characteristics when it is used as a tackifier or hot-melt adhesive.

A further object of this invention is to provide a method for preparing hydrocarbon resins having the above-mentioned characteristics.

As a result of extensive investigations with a view to overcoming the above defect of resins derived from 1,3-pentadiene and α-methylstyrene, we have unexpectedly found that when these two components are copolymerized together with cyclopentene, resins free from such defects can be obtained.

Thus, according to this invention, there are provided: a method for preparing a novel hydrocarbon resin having a softening point of 60° to 140° C. and being soluble in hydrocarbon solvents, which comprises polymerizing a monomeric mixture comprising (a) about 35 to 85% by weight of 1,3-pentadiene, (b) about 10 to 50% by weight of α-methylstyrene, (c) about 5 to 30% by weight of cyclopentene and (d) 0 to about 15% by weight of 1,3-butadiene in a solvent containing at least 50% by weight of an aromatic hydrocarbon in the presence of an aluminum halide; and hydrocarbon resins obtained by the above method which comprise (a) about 45 to 85% by weight of units derived from 1,3-pentadiene, (b) about 10 to 45% by weight of units derived from α-methylstyrene, (c) about 3 to 20% by weight of units derived from cyclopentene, and (d) 0 to about 20% by weight of units derived from 1,3-butadiene, and having a softening point of from about 60° C. to about 140° C.

As described above, the monomeric mixture used in the present invention comprises 35 to 85% by weight of 1,3-pentadiene, 10 to 50% by weight of α-methylstyrene, 5 to 30% by weight of cyclopentene and 0 to 15% by weight of 1,3-butadiene. With an increasing content of α-methylstyrene in the monomeric mixture, the softening point and melt viscosity of the resulting hydrocarbon resin decrease, and its compatibility with rubbers or thermoplastic resins is improved. These effects are seen only when cyclopentene is present in the monomeric mixture. When the content of cyclopentene in the monomeric mixture is less than 5% by weight, the resulting hydrocarbon resin is not entirely satisfactory in respect of melt viscosity and compatibility with rubbers or thermoplastic resins, even when the content of α-methylstyrene is high. Furthermore, its tackiness characteristics for use as a tackifier for rubber are also somewhat inferior. For this reason, the method of this invention requires the use of a monomeric mixture having an α-methylstyrene content of at least about 10% by weight and a cyclopentene content of at least about 5% by weight. However, when the contents of 60-methylstyrene and cyclopentene becomes too high, the rate of reaction is reduced drastically, and the resulting hydrocarbon resin has too low a softening point. Accordingly, the content of α-methylstyrene must be up to about 50% by weight, the content of cyclopentene up to about 30% by weight, and the content of 1,3-pentadiene more than about 35% by weight.

On the other hand, when the content of 1,3-pentadiene in the monomeric mixture is too high, the polymerization system become unstable, and a gel-like polymer tends to be formed. Furthermore, the melt viscosity of the resulting hydrocarbon resin and its compatibility with thermoplastic resins deteriorate. Accordingly, the content of 1,3-pentadiene needs to be not more than 85% by weight.

If desired, not more than about 15% by weight, preferably 2 to 10% by weight, of 1,3-butadiene can be incorporated in the monomeric mixture. The use of 1,3-butadiene in addition to the above-mentioned three components affords hydrocarbon resins which show superior tackiness or adhesives when used as tackifiers or hot-melt adhesives.

The monomeric mixture used in this invention may further contain other copolymerizable unsaturated hydrocarbons so long as the addition of such further components does not essentially impair the effects of the present invention. For example, an aliphatic monoolefin containing 4 to 10 carbon atoms, such as butene, pentene, hexane, heptene or octene, may be incorporated in an amount of up to about 20% by weight in the monomeric mixture. However, the content of a diolefin such as isoprene, cyclopentadiene, methylcyclopentadiene or dicyclopentadiene which may be optionally included in the monomeric mixture is preferably kept at not more than 5% by weight because its presence in a large quantity in the monomeric mixture would increase the melt viscosity of the resulting hydrocarbon resin or reduce the compatibility of the hydrocarbon resin with rubbers or thermoplastic resins.

In the polymerization reaction in accordance with this invention, aluminum halides are used as catalysts. Specific examples of the aluminum halide are aluminum chloride, aluminum bromide, aluminum iodide and aluminum fluoride. Of these, the aluminum chloride and aluminum bromide are preferred, the former being especially preferred. Since the contact of the monomeric mixture with the catalyst is important in the polymerization reaction, the aluminum halide is employed as particles having a size of usually 5 to 200 mesh, preferably 20 to 200 mesh. The particle size range given above is not critical, however, and larger or smaller particles may be used. The catalyst needs to be used in an amount sufficient to perform the polymerization reaction smoothly, and the amount of the catalyst is usually 0.1 to 5 parts by weight, preferably 0.5 to 2 parts by weight, per 100 parts by weight of the monomeric mixture.

The catalyst may be added to the monomeric mixture, or conversely, the monomeric mixture may be added to a catalyst. If desired, both may be introduced simultaneously into the reactor. The reaction can be performed either batchwise or continuously in accordance with a known procedure.

Since the reaction is usually exothermic, the polymerization temperature can be advantageously controlled by causing a solvent to be present in the polymerization system. The solvent that can be used for this purpose is an aromatic hydrocarbon such as benzene, monochlorobenzene, toluene or xylene. If an aliphatic hydrocarbon such a pentane or hexane is used as the solvent, a gel-like polymer insoluble in hydrocarbons tends to occur when the starting monomeric mixture has a high content of 1,3-pentadiene. When a halogen-containing solvent such as dichloromethane or carbon tetrachloride is used, the same tendency is observed, and moreover, the resulting resin has a low softening point. In order, therefore, to achieve the objects of this invention, it is essential to use aromatic hydrcarbons as the solvent. Even when the aromatic hydrocarbon is used as a mixture with another solvent, the aromatic hydrocarbon must be present in the mixture in an amount of at least 50% by weight. The amount of the solvent is usually 20 to 1000 parts by weight, preferably 50 to 500 parts by weight, per 100 parts by weight of the monomeric mixture.

The polymerization is carried out usually at $-20°$ C. to $100°$ C., preferably $0°$ C. to $80°$ C. The pressure of the reaction system may be atmospheric, elevated or reduced. The reaction time is not critical, and generally, can be varied from several seconds to 12 hours or even longer.

The resulting hydrocarbon resin can be obtained by separating the product by treating the reaction mixture in a customary manner, and drying it. The resulting hydrocarbon comprises (a) about 45 to 85% by weight of units derived from 1,3-petadiene, (b) about 10 to 45% by weight of units derived from $\alpha$-methylstyrene, (c) about 3 to 20% by weight of units derived from cyclopentene and (d) 0 to about 20% by weight of units derived from 1,3-butadiene. The composition of the resulting polymer differs from that of the monomeric mixture charged. This is because there is a difference in copolymerizability among the individual monomers. This hydrocarbon resin further has a low melt viscosity, a Gardner color number (ASTM D-1544-63T) of not more than 6, and a softening point (JIS K-2531) of $60°$ to $140°$ C., preferably $65°$ to $120°$ C., and is soluble in solvents such as aliphatic, aromatic and halogentated hydrocarbons, for example, pentene, hexane, benzene, xylene, chloroform, and carbon tetrachloride. The hydrocarbon resin is well miscible with elastomers such as natural and synthetic rubbers, synthetic resins such as polyethylene or an ethylene/vinyl acetate copolymer, natural resins such as polyterpene or rosin, and various waxes.

Since this hydrocarbon resin imparts superior characteristics in respect of water repellency, tackiness, cohesive strength, adhesive strength, resistance to heat aging, and resistance to ultraviolet rays, it is useful as a tackifier for an adhesive tape by mixing with natural or synthetic rubbers, and also as a tackifying agent for imparting tackiness to unvulcanized rubbers. In particular, for natural rubber, the hydrocarbon resin of this invention exhibits better tackifying effects than rosin, which has been regarded as the best tackifying agent heretofore available. Furthermore, the hydrocarbon resin of this invention is well miscible with a styrene/butadiene copolymer rubber and imparts superior tackiness thereto in spite of the previously accepted view that generally aliphatic hydrocarbon resins are difficultly miscible with styrene/butadiene copolymer rubber.

Furthermore, the hydrocarbon resins of this invention have good compatibility with materials for hot-melt adhesives or coating agents, such as polyethylene, an ethylene/vinyl acetate copolymer, paraffin, waxes and microcrystalline waxes. Hence, the hydrocarbon resins of this invention forms a homogeneous phase and can fully exhibit its tackifying effect when mixed with these materials and used as hot-melt adhesives or coating agents. The hydrocarbon resins of this invention further have the advantage that they afford compounded products having a low cloud point, and therefore, can be used without being exposed to high temperatures. The hydrocarbon resins of this invention also possess the property of having low melt viscosity. This property is very effective in that the hydrocarbon resin imparts sufficient flowability when coating the compounded products.

The present invention can therefore avoid various losses ascribable to high temperature heating during the use of hot-melt compounds, such as the need to supply a great amount of heat, the decomposition, owing to the heat, of the compound and the material on which to coat the compound, and the incidental changes in viscosity and occurrence of offensive odors. Because of the superior heat stability of the hydrocarbon resins of this invention, the invention gives an economic advantage in that the quality of the compounded product is stabilized, and the amount of anti-oxidant can be reduced.

The following Examples illustrate the present invention more specifically. Unless otherwise specified, all parts and percentages in the examples are by weight.

EXAMPLE 1

A 3-liter glass flask was charged with 1060 g of benzene and 8.4 g of aluminum chloride having a particle size of about 40 mesh. With stirring, the temperature of the mixture was maintained at 40° C. 700 g of a hydrocarbon mixture having the compositions shown in Table 1 was gradually added to the resulting mixture continuously over 120 minutes. Since the temperature rose from the exothermic reaction, the reaction mixture was cooled to maintain it at 55° C.

After the addition, the polymerization system was maintained at 55° C., and stirred for an additional 30 minutes. 30 ml. of a mixture of equal volumes of methanol and 28% ammonia water was added to decompose the aluminum chloride. The inactivated catalyst particles were removed by filtration. The filtrate was transferred into a 3-liter glass flask, and heated while introducing nitrogen, thereby to evaporate off the unreacted hydrocarbon and solvent. The residue was then heated to 230° C.

In order to remove the oligomeric products resulting from the polymerization reaction and the remaining solvent, saturated steam was introduced into the flask. After confining that there was hardly any oily phase in the distillate, the introduction of the steam was stopped. The molten residue was withdrawn, and allowed to cool to room temperature. Thus, yellow hydrocarbon resins were obtained.

Each of the hydrocarbon resins obtained was tested for softening point (measured by the ring and ball test stipulated in JIS K-2531), Gardner color number (measured by ASTM D1544-63T), and melt viscosity at 200° C. (measured by a Brookfield-type viscometer). In order to examine the compatibility of each of the hydrocarbon resins with an ethylene/vinyl acetate copolymer and paraffin wax, a mixture was prepared from 100 parts of an ethylene/vinyl acetate copolymer (vinyl acetate content 28%; melt index 400 g/10 minutes), 100 parts of paraffin wax (melting point 144° F), and 100 parts of each of the hydrocarbon resins obtained. The cloud point of the mixture was measured in accordance with the method stipulated in JIS K-2266. The results are shown in Table 2.

The composition of the hydrocarbon resins shown in Table 2 were calculated on the basis of the composition of the starting monomeric mixture and the unreacted monomeric mixture recovered.

Table 1

| Monomeric mixture Components | Controls | | | | | | | | Examples of Invention | | | | | | | |
|---|---|---|---|---|---|---|---|---|---|---|---|---|---|---|---|---|
| | A | | B | | C | | D | | E | | F | | G | | H | |
| | Parts | % | Parts | % | Parts | % | Parts | % | Parts | % | Parts | % | Parts | % | Parts | % |
| 1,3-pentadiene | 78.7 | 80.0 | 69.0 | 70.0 | 85.6 | 86.3 | 68.8 | 76.8 | 65.4 | 72.7 | 58.9 | 64.7 | 52.2 | 50.6 | 53.5 | 58.2 |
| cyclopentene | — | — | — | — | 8.6 | 8.7 | 16.3 | 18.2 | 15.6 | 17.3 | 13.9 | 15.3 | 12.3 | 13.4 | 12.7 | 13.8 |
| α-methylstyrene | 19.7 | 20.0 | 29.6 | 30.0 | 5.0 | 5.0 | 4.5 | 5.0 | 9.0 | 10.0 | 18.2 | 20.0 | 23.0 | 25.0 | 23.0 | 25.0 |
| 1,3-butadiene | — | — | — | — | — | — | — | — | — | — | — | — | 4.6 | 5.0 | — | — |
| cyclopentadiene | — | — | — | — | — | — | — | — | — | — | — | — | — | — | 2.8 | 3.0 |
| isoprene | — | — | — | — | — | — | — | — | — | — | — | — | — | — | — | — |
| $C_5$-$C_6$ saturated hydrocarbon | 1.0 | | 1.0 | | 0.8 | | 5.5 | | 5.2 | | 4.7 | | 4.1 | | 4.3 | |
| $C_5$-$C_6$ unsaturated hydrocarbon | 0.6 | | 0.4 | | — | | 4.9 | | 4.8 | | 4.3 | | 3.8 | | 3.7 | |
| Total | 100 | 100 | 100 | 100 | 100 | 100 | 100 | 100 | 100 | 100 | 100 | 100 | 100 | 100 | 100 | 100 |

| Monomeric mixture Components | Controls | | | | Examples of Invention | | | | | | Control | |
|---|---|---|---|---|---|---|---|---|---|---|---|---|
| | I | | J | | K | | L | | M | | N | |
| | Parts | % | Parts | % | Parts | % | Parts | % | Parts | % | Parts | % |
| 1,3-pentadiene | 50.7 | 54.9 | 50.7 | 54.9 | 52.1 | 56.6 | 45.2 | 48.5 | 41.7 | 44.5 | 30.9 | 32.4 |
| cyclopentene | 12.1 | 13.1 | 12.1 | 13.1 | 12.3 | 13.4 | 10.8 | 11.5 | 9.8 | 10.5 | 7.3 | 7.6 |
| α-methylstyrene | 23.1 | 25.0 | 23.1 | 25.0 | 27.6 | 30.0 | 37.3 | 40.0 | 42.2 | 45.0 | 57.2 | 60.0 |
| 1,3-butadiene | — | | — | | — | | — | | — | | — | |
| cyclopentadiene | 6.5 | 7.0 | — | | — | | — | | — | | — | |
| isoprene | — | | 6.5 | 7.0 | — | | — | | — | | — | |
| $C_5$-$C_6$ saturated hydrocarbon | 4.1 | | 4.1 | | 4.2 | | 3.5 | | 3.3 | | 2.4 | |
| $C_5$-$C_6$ unsaturated hydrocarbon | 3.5 | | 3.5 | | 3.8 | | 3.2 | | 3.0 | | 2.2 | |
| Total | 100 | 100 | 100 | 100 | 100 | 100 | 100 | 100 | 100 | 100 | 100 | 100 |

Table 2

| Run No. | Controls | | | | Examples of Invention | | | | Controls | | Examples of Invention | | | Control |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Monomeric mixture | A | B | C | D | E | F | G | H | I | J | K | L | M | N |
| Composition (%) of the resin 1,3-pentadiene | 80 | 70 | 90 | 84 | 78 | 67 | 58 | 64 | 60 | 60 | 60 | 52 | 50 | 45 |
| cyclopentene | — | — | 5 | 10 | 10 | 9 | 8 | 8 | 8 | 8 | 8 | 7 | 8 | 7 |
| α-methylstyrene | 20 | 30 | 5 | 4 | 10 | 22 | 27 | 23 | 22 | 22 | 30 | 39 | 40 | 47 |
| 1,3-butadiene | — | — | — | — | — | — | 5 | — | — | — | — | — | — | — |
| cyclopentadiene | — | — | — | — | — | — | — | 3 | 8 | — | — | — | — | — |
| isoprene | — | — | — | — | — | — | — | — | — | 8 | — | — | — | — |
| others | — | — | — | 2 | 2 | 2 | 2 | 2 | 2 | 2 | 2 | 2 | 2 | 1 |
| Yield (%) | 94 | 93 | 49 | 90 | 89 | 83 | 81 | 92 | 93 | 90 | 82 | 81 | 80 | 39 |
| Yield of oligomers (%) | 5 | 6 | 9 | 6 | 5 | 7 | 13 | 8 | 7 | 7 | 9 | 9 | 13 | 21 |
| Presence of gel | Yes | Somewhat Yes | Yes, in great quantity | No | No | No | No | No | Yes | Yes | No | No | No | No |
| Softening point (° C.) | 115 | 111 | 73 | 104 | 106 | 103 | 85 | 101 | 113 | 115 | 99 | 93 | 87 | 42 |
| Gardner color number | 4 | 3 | 5 | 4 | 3 | 3 | 4 | 3 | 5 | 5 | 3 | 4 | 4 | 6 |
| Melt viscosity (CPS) | 410 | 395 | 310 | 360 | 295 | 162 | 82 | 125 | 401 | 405 | 110 | 105 | 85 | 51 |
| Cloud point (° C.) | >170 | >170 | >170 | >170 | 94 | 75 | 73 | 73 | >170 | >170 | 73 | 73 | 73 | 73 |

The following evaluations can be made on the basis of the results shown in Table 2.

In the case of a two-component system consisting of 1,3-pentadiene and α-methylsutyrene, its effect of reducing the melt viscosity is not so appreciable even when the content of the α-methylstyrene is increased. However, with a three-component system containing cyclopentene, the melt viscosity is drastically reduced with increasing content of the α-methylstyrene, and the cloud point of the mixture also decreases. (Low cloud points mean that the hydrocarbon resin has superior compatibility with the ethylene/vinyl acetate copolymer and paraffin wax.)

When the amount of α-methylstyrene is too large, the rate of reaction decreases or the amounts of the oligomeric products increase. Furthermore, the softening point of the hydrocarbon resin becomes too low.

On the contrary, when the content of α-methylstyrene is too low, the effects of reducing the melt viscosity and of improving the compatibility are not satifactory even when cyclopentene is present. In addition, when the content of 1,3-pentadiene is high, gellation tends to occur.

When 1,3-butadiene is copolymerized together with 1,3-pentadiene, α-methylsytrene and cyclopentene, there can be obtained a hydrocarbon resin having a low melt viscosity and good compatibility. However, when isoprene or cyclopentadiene is present in an amount of 7% by weight, the effects of reducing the melt viscosity and of improving the compatibility are not entirely satisfactory.

In Run No. 3 in which the contents of α-methylstyrene and cyclopentene are low, the resulting resin has a low softening point. This is mainly because the high-molecular-weight polymer becomes gelled.

EXAMPLE 2

In order to evaluate the applicability of the hydrocarbon resins obtained by this invention (the resins obtained in Runs Nos. 6 and 7) to hot-melt compounds, 200 parts of an ethylene/vinyl acetate copolymer (vinyl acetate content 28%, melt index 400), 100 parts of paraffin wax (melting point 145° F) and 200 parts of each of the hydrocarbons were melt-mixed at 170° C. The resulting mixture was coated in a thickness of 0.2 mm on a 0.1 mm thick aluminum plate. Another aluminum plate was superimposed on the coated surface of the aluminum plate, and the laminate was sealed for 5 minutes at a temperature of 160° C. and a pressure of 120 kg/cm² to form a laminate sample. The sample was cut into a rectangular form with a width of 25 mm to form test pieces. The test piece was pulled at a speed of 150 mm/minute at 25° C., and the adhesive strength of the test piece determined by a 90° peeling method. For comparison, test pieces were prepared in the same way as above from a generally used rosin derivative and a hydrocarbon resin of Run No. 4 having a low content of α-methylstyrene, and their adhesive strength was measured. The results are shown in Table 3.

Table 3

| Resin | Hydrocarbon resins of this invention | | Controls | |
|---|---|---|---|---|
| | Run No. 6 | Run No. 7 | Run No. 4 | Rosin derivative* |
| Softening point of the resin (° C) | 103 | 85 | 104 | 85 |
| Adhesive strength (Kg/25 mm) | 2.0 | 2.9 | 1.0 | 2.7 |

*Glycerin ester of rosin

These results demonstrate that the hydrocarbon resins of this invention are suitable as materials for hot-melt adhesives. Above all, the hydrocarbon resin prepared in Run No. 7 which contains a small amount of units derived from 1,3-butadiene exhibits better effects than the rosin derivative. However, the hydrocarbon resin prepared in Run No. 4 which contains a small amount of units derived from α-methylstyrene has insufficient compatibility with the ethylene/vinyl acetate copolymer, and inferior adhesive strength.

EXAMPLE 3

In order to evaluate the applicability of the hydrocarbon resins obtained in this invention (the resins obtained in Runs Nos. 6, 7 and 8 of Example 1) to adhesive compositions, the following experiment was carried out using natural rubber (pale crepe; Mooney Viscosity $ML_{1+4}$ at 100° C., 60) and a styrenebutadiene copolymer rubber (NIPOL 1006, trademark for a product of Nippon Zeon Co., Ltd., Mooney viscosity $ML_{1+4}$ at 100° C., 50).

80 parts of each of the hydrocarbon resins and 1 part of an antioxidant were mixed with 100 parts of the rubbers, and toluene was added to form a solution with a solids content of 15%. The solution was coated in a thickness of 25 microns on a 1 mil thick polyester film to form an adhesive tape, and its thickness, adhesive strength and cohesive strength were measured. For comparison, adhesive tapes were prepared in the same way as above using a rosin derivative (a glycerin ester of hydrogenated rosin having a softening point of 71° C.) and the hydrocarbon resins prepared in Runs Nos. 1, 2, 9 and 10 of Example 1. The properties of these tapes were also measured, and the results are shown in Table 4.

The tackiness was measured in accordance with the J. Dow method [Proc. Inst. Rub. Ind., 1, 105 (1954)]. An adhesive tape, 10 cm long, is adhered to the inclined surface of a stainless steel plate incined at an angle of 30° C, and 32 stainless balls differing in diameter from 1/32 inch to 1 inch are rolled down at a position 10 cm above the adhesive tape at an initial speed of 0 and allowed to stop on the adhesive tape by its tackiness. The tackiness is expressed by the diameter of the largest ball among those which stop at the tape surface.

The adhesive strength is measured in accordance with the method of JIS Z-1522. An adhesive tape, 25 mm wide and 100 mm long, it adhered to the surface of a stainless steel plate polished with a water-resistant polishing paper (No. 280), and pulled in a direction with an angle of 180° at 25° C. at a speed of 200 mm/minute. The adhesive strength is expressed by the force required to peel off the tape.

The cohesive strength is measured in accordance with JIS Z-1542. An adhesive tape is adhered to the surface of a similarly treated stainless steel plate so that its area of 25 mm × 10 mm may make contact with the stainless steel plate. At 40° C., a load of 1kg is exerted, and the time required until a deviation of 1 mm occurs. The cohesive strength is expressed by this time.

contain cyclopentene copolymerized therewith, and the hydrocarbon resins in Runs Nos. 9 and 10 which have cyclopentadiene or isoprene copolymerized in great quantities have very inferior tackiness.

What we claim is:

1. A method for preparing hydrocarbon resin polymers which comprises polymerizing a monomeric mixture consisting essentially of about 35 to 85% by weight of 1,3-pentadiene, (b) about 10 to 50% by weight of α-methylstyrene, (c) about 5 to 30% by weight of cyclopentene and (d) 0 to about 15% by weight of 1,3-butadiene in a solvent comprising at least 50% by weight of an aromatic hydrocarbon and in the presence of an aluminum halide as a catalyst.

2. The method of claim 1 wherein said solvent is used in an amount of 20 to 1000 parts by weight per 100 parts by weight of the monomeric mixture.

3. The method of claim 1 wherein the polymerization is carried out at a temperature of −20° C. to 100° C.

4. The method of claim 1 wherein the 1,3-butadiene is present in an amount of from about 2 to 10% by weight.

5. The method of claim 1 wherein the α-methylstyrene monomer is present in at least 22% by weight.

6. The method of claim 1 wherein the catalyst is aluminum chloride or aluminum bromide and is present in from 0.1 to 5 parts by weight per 100 parts by weight of the monomeric mixture.

7. The method of claim 1 wherein the solvent is present in from 50 to 500 parts by weight and the catalyst is present in from 0.5 to 2 parts by weight, per 100 parts by weight of the monomeric mixture respectively; and the polymerization is carried out at a temperature of from 0° C. to 80° C.

8. The product of the method of claim 3, having a softening point of from about 60° C. to about 140° C., and a Gardner color number (ASTM D-1544-63T) of not more than 6.

9. The polymers of claim 8 wherein the 1,3-butadiene is present.

10. The polymers of claim 8 wherein they also have a cloud point of not higher than 94° C.

11. The polymers of claim 8 wherein the softening point is from 65° to 120° C.

Table 4

| Adhesive | Examples of Invention | | | | | | | Controls | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| RECIPE (parts) | | | | | | | | | | | | | | |
| Natural rubber | 100 | 50 | — | 100 | 50 | — | 100 | 100 | 50 | — | 100 | 100 | 100 | 100 |
| S B R | — | 50 | 100 | — | 50 | 100 | — | — | 50 | 100 | — | — | — | — |
| Resin of Run No. 6 | 80 | 80 | 80 | — | — | — | — | — | — | — | — | — | — | — |
| Resin of Run No. 7 | — | — | — | 80 | 80 | 80 | — | — | — | — | — | — | — | — |
| Resin of Run No. 8 | — | — | — | — | — | — | 80 | — | — | — | — | — | — | — |
| Rosin derivative | — | — | — | — | — | — | — | 80 | 80 | 80 | — | — | — | — |
| Resin of Run No. 1 | — | — | — | — | — | — | — | — | — | — | 80 | — | — | — |
| Resin of Run No. 2 | — | — | — | — | — | — | — | — | — | — | — | 80 | — | — |
| Resin of Run No. 9 | — | — | — | — | — | — | — | — | — | — | — | — | 80 | — |
| Resin of Run No. 10 | — | — | — | — | — | — | — | — | — | — | — | — | — | 80 |
| PROPERTIES | | | | | | | | | | | | | | |
| Tackiness (1/32 inch) | 20 | 15 | 5 | 22 | 16 | 10 | 16 | 20 | 18 | 13 | 3 | 6 | 3 | 3 |
| Adhesive strength (g/inch) | 400 | 725 | 3000 | 400 | 625 | 3025 | 410 | 173 | 575 | 3100 | 410 | 450 | 420 | 410 |
| Cohesive strength (min/mm) | 25 | 13 | 21 | 26 | 10 | 19 | 25 | 14 | 7 | 12 | 21 | 27 | 26 | 27 |

The following evaluations can be made on the basis of the results shown in Table 4.

The adhesives obtained by mixing the hydrocarbon resins of this invention with natural rubber and/or SBR have equivalent or better performance to or than the adhesives obtained by using the rosin derivative which has been in frequent use heretofore.

On the other hand, the adhesives obtained by using the hydrocarbons in Runs Nos. 1 and 2 which do not

UNITED STATES PATENT OFFICE
CERTIFICATE OF CORRECTION

Patent No. 4,048,424  Dated September 13, 1977

Inventor(s) ISHIKAWA, ET AL.

It is certified that error appears in the above-identified patent and that said Letters Patent are hereby corrected as shown below:

Claim 1, line 3, after "of" insert -- (a) --.

Signed and Sealed this

Third Day of January 1978

[SEAL]

Attest:

RUTH C. MASON
Attesting Officer

LUTRELLE F. PARKER
Acting Commissioner of Patents and Trademarks